United States Patent
Chen et al.

(10) Patent No.: US 11,836,984 B2
(45) Date of Patent: Dec. 5, 2023

(54) ELECTRONIC DEVICE AND METHOD FOR COUNTING OBJECTS

(71) Applicant: Logistics and Supply Chain MultiTech R&D Centre Limited, Pok Fu Lam (HK)

(72) Inventors: Hung Kwan Chen, Pok Fu Lam (HK); Chi Hung Tong, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 375 days.

(21) Appl. No.: 17/253,293

(22) PCT Filed: Jun. 29, 2018

(86) PCT No.: PCT/CN2018/093676
§ 371 (c)(1),
(2) Date: Dec. 17, 2020

(87) PCT Pub. No.: WO2020/000368
PCT Pub. Date: Jan. 2, 2020

(65) Prior Publication Data
US 2021/0271895 A1    Sep. 2, 2021

(51) Int. Cl.
*G06V 20/52* (2022.01)
*G06T 7/50* (2017.01)
(Continued)

(52) U.S. Cl.
CPC ............ *G06V 20/52* (2022.01); *G01S 7/4865* (2013.01); *G01S 7/52085* (2013.01); *G06T 7/50* (2017.01);
(Continued)

(58) Field of Classification Search
CPC ...... G06V 20/52; G06V 10/803; G06V 40/10; G06V 10/80; G01S 7/4865;
(Continued)

(56) References Cited

U.S. PATENT DOCUMENTS 5,877,688 A * 3/1999 Morinaka ............... G01S 7/483
374/45
10,514,256 B1 * 12/2019 Kamarshi ................ G01C 3/08
(Continued)

FOREIGN PATENT DOCUMENTS

CN  102622588   8/2012
CN  102881239   1/2013
(Continued)

*Primary Examiner* — Kenny A Cese
(74) *Attorney, Agent, or Firm* — Renner, Kenner, Greive, Bobak, Taylor & Weber

(57) ABSTRACT

A system and a method for an electronic device for counting objects of similar type in an area includes a register for storing a number of count of the objects in the area; a depth sensor for measuring depth distances between a plurality of points of an object and the depth sensor; a thermal sensor for measuring temperatures of the points of the object; wherein the distances and the temperatures are used to derive spatial thermal information of the object for determining an increase in the number stored in the register.

19 Claims, 6 Drawing Sheets

(51) Int. Cl.
*G01S 7/4865* (2020.01)
*G01S 7/52* (2006.01)
*H04N 5/33* (2023.01)
*G06V 40/10* (2022.01)
*G06V 10/80* (2022.01)

(52) U.S. Cl.
CPC ............ *G06V 10/803* (2022.01); *G06V 40/10* (2022.01); *H04N 5/33* (2013.01); *G06T 2207/10028* (2013.01); *G06T 2207/10048* (2013.01); *G06T 2207/10132* (2013.01); *G06T 2207/30196* (2013.01); *G06T 2207/30242* (2013.01); *G06V 10/80* (2022.01)

(58) Field of Classification Search
CPC .................. G01S 7/52085; G06T 7/50; G06T 2207/10028; G06T 2207/10048; G06T 2207/10132; G06T 2207/30196; G06T 2207/30242; H04N 5/33; G06F 18/251
USPC .......................................................... 382/103
See application file for complete search history.

(56) References Cited

U.S. PATENT DOCUMENTS

| | | | |
|---|---|---|---|
| 10,982,871 B2 * | 4/2021 | Tsuda | G06T 7/00 |
| 2011/0116055 A1 * | 5/2011 | Nakamura | H04N 9/3147 |
| | | | 353/82 |
| 2013/0088422 A1 * | 4/2013 | Niikura | G06F 3/0304 |
| | | | 345/156 |
| 2013/0182905 A1 * | 7/2013 | Myers | A61B 5/1128 |
| | | | 382/103 |
| 2014/0368615 A1 * | 12/2014 | van Baar | G01S 17/894 |
| | | | 382/154 |
| 2016/0191327 A1 | 6/2016 | Bi et al. | |
| 2017/0156673 A1 * | 6/2017 | Uchida | A61B 5/0077 |
| 2018/0106598 A1 * | 4/2018 | Ushijima | G01S 17/89 |
| 2019/0362507 A1 * | 11/2019 | Papari | G06T 5/20 |
| 2020/0256734 A1 * | 8/2020 | Zhu | A61B 5/6887 |

FOREIGN PATENT DOCUMENTS

| | | |
|---|---|---|
| CN | 106934752 | 7/2017 |
| WO | 2016139203 | 9/2016 |

\* cited by examiner

ELECTRONIC DEVICE AND METHOD FOR COUNTING OBJECTS

TECHNICAL FIELD

The invention relates in general to an electronic device and a method for counting objects and, in particular, a system, a device and a method for counting live objects based on fusion of depth and thermal sensor.

BACKGROUND

Object counting technology can provide valuable data for different purpose. For example, information related to number of people may be useful to professionals in making decision on personnel scheduling, resource allocation, business strategy, and security monitoring.

Early approaches in counting people can only be contacted manually and through mechanical means. Such activities will cause inconvenience and interrupt human flow.

Technologies such as electronic triggers or photoelectric sensors may be used to detect head count. These devices were simple and easy to install. However, they were ineffective in a crowded area when there were a lot of people blocking each other.

Video people counting technology can provide a new real-time, accurate and time, accurate and non-interference method for counting passengers. It became popular very fast and turned into a hot topic for research and development. Although, the technology over video people counting has advanced rapidly and was making great progress, this technology suffers a number of drawbacks.

SUMMARY OF INVENTION

It is, therefore, an object of the present invention to provide a system, a device and a method for people counting system based on depth and thermal sensors or camera.

Other objects and advantages will become apparent when taken into consideration with the following specification and drawings.

It is also an object of the present invention to overcome or ameliorate at least one of the disadvantages of the prior art, or to provide a useful alternative. It is a first aspect of the present invention to provide a counting device for counting objects of similar type in an area, comprising:
- a register for storing a number of count of the objects in the area;
- a depth sensor for measuring depth distances between a plurality of points of an object and the depth sensor;
- a thermal sensor for measuring temperatures of the points of the object;
- wherein the distances and the temperatures are used to derive spatial thermal information of the object for determining an increase in the number stored in the register.

Preferably, the depth sensor identifies an object by collating a plurality of points having depth distance of similar depth level into object groups.

Preferably, the similar depth level is determined by a reference depth distance and a tolerant range value.

Preferably, a point is collated to an object group if the depth distance of the point is within the tolerant range value of the reference depth distance.

Preferably, the depth sensor is a time of flight sensor for detecting an electromagnetic wave signal reflected back from the object.

Preferably, the electromagnetic signal is modulated with high speeds up to 100 MHz.

Preferably, the counting device further comprises an illumination unit for emitting electromagnetic wave signals.

Preferably, the illumination unit comprises one or more light emitting diodes for emitting electromagnetic wave signal.

Preferably, the illumination unit is adapted to emitting electromagnetic wave signals of a plurality of wave lengths.

Preferably, the depth sensor comprises an ultrasound sensor and an ultrasound emitter.

Preferably, the thermal sensor comprises an infrared photodetector.

Preferably, the infrared photodetector is a quantum well infrared photodetector.

Preferably, the infrared photodetector is a thermal infrared sensor.

Preferably, the counting device further comprises a processing unit for determining whether an object belongs to a type of object by comparing the temperatures of an object group with one or more temperature pattern of the type of object.

Preferably, the type of object belongs to a homosapien class.

Preferably, the counting device further comprises a memory module for storing the spatial thermal information of a plurality of consecutive time intervals.

Preferably, the number stored in the register is increased when an object is identified in the spatial thermal information of a current time interval and the object was not identified in the spatial information of a previous time interval.

In a second aspect of the present invention, there is provided a method of counting a type of object within an area, comprising the step of:
- collecting distance data of one or more object in the area with a depth sensor, such that an object in the area is identified;
- collecting temperature data of the object in the area;
- combining the distance data and temperature data to derive a spatial thermal information for determining the object belongs to a type of objects;
- increasing a number stored in a register in the event that the spatial thermal information of the object is not found in the the spatial information of objects in a previous time interval.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1A:
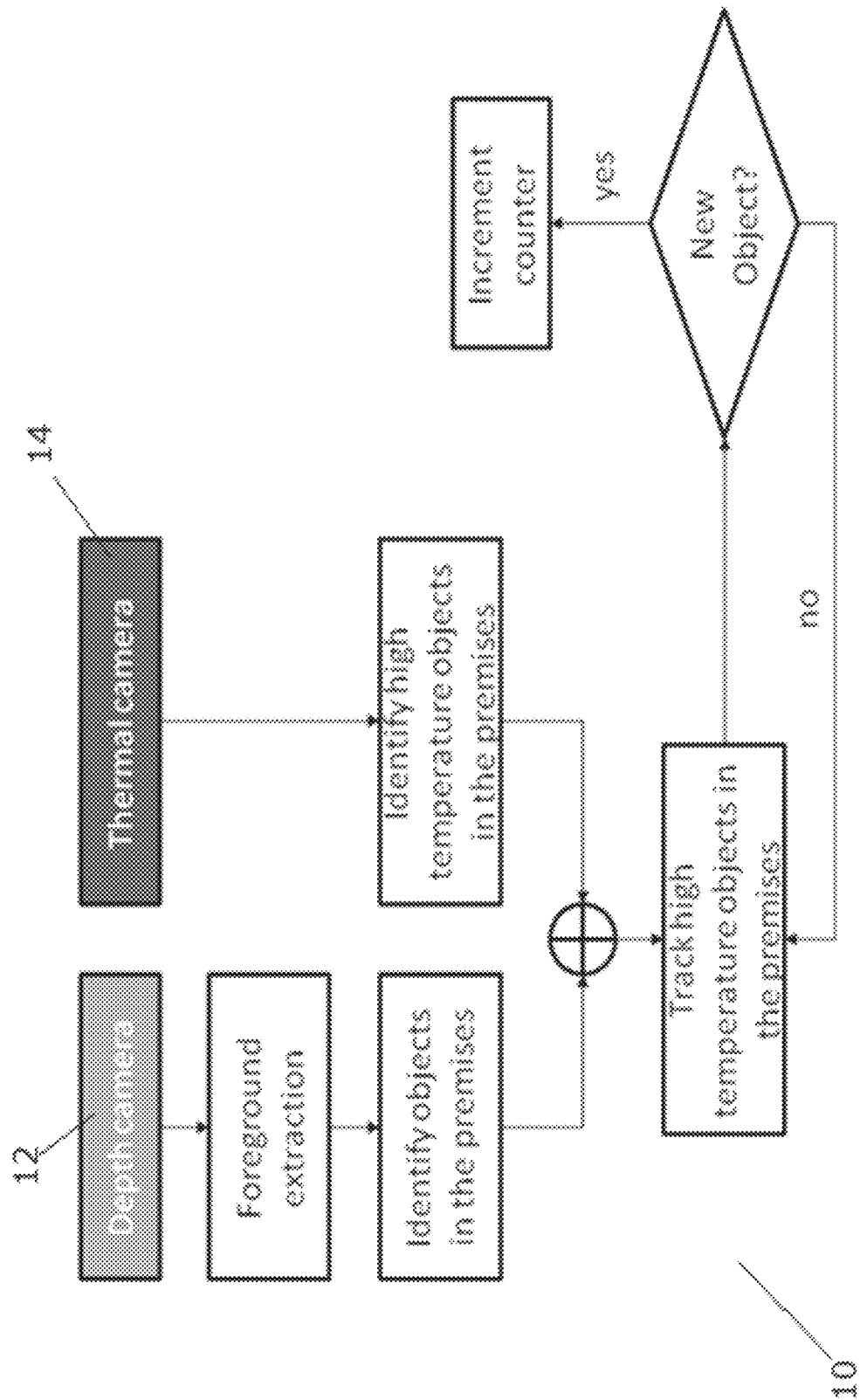
FIG. 1A is a schematic diagram of a counting device of an embodiment of the present invention.

The inventors have, through their own research, trials and experiments, devised that video counting system may be based on video camera to capture the scene of an area. Typically, this kind of system usually captures images using optical camera or digital camera with CCD (charged coupled device) and CMOS (complementary metal-oxide-semiconductor). It was designed main for capturing the colours of visible light spectrum. The images recorded were directly affected by environmental changes such as ambient lights, and shadows. Further, in a crowded scene, it was very difficult to effectively split clumps of passengers and estimate number of head counts accurate. The effectiveness of this method was highly depended on the pattern recognition algorithm and the computational power available. When the accuracy of the video counting technology relies heavily on the algorithm and sheer computing power of the machine running the algorithm, the cost of this type of technology was typically high and hence the permeation rate was generally low.

Another draw-back of the video counting system is that those images or video clips also record facial appearances of people which leads to privacy concern. The installation of CCTV may give rise to public's concern on its invasion of privacy. In particular for law enforcement, certain jurisdiction prohibited the use of colour video surveillance with facial recognition which may cause these people counting methods becomes inaccurate.

In one example embodiment, a head counting device may perform a method for counting people heads. The method comprises the step of capturing images, moving images of a predetermined counting view, detecting a motion region in the moving images of the predetermined counting view; calculating a motion region speed value indicating a speed of movement of the motion region. A contribution zone is repeatedly defined based on a predetermined counting boundary, the motion region speed value, and a contribution time period. A sub area value representing the size of the area of the motion region contained in the defined contribution zone is repeatedly retrieved and registered. A total area value is generated by adding a plurality of registered sub area values, and estimating the number of objects that have passed the counting boundary based on a reference object area value.

In an alternative example, a people counter may be used for estimating the number of people crossing a counting boundary. The people counter had an image sensor arranged to capture images of a predetermined counting view; a motion region detector arranged to, in the captured images, detect motion region areas passing the counting boundary; an area accumulator arranged to accumulate a total motion region by integrating the motion region areas detected by the motion region detector, wherein integrating comprised summing area slices of motion regions from a plurality of the captured images. The people count also had an object counting unit arranged to estimate the number of objects that have passed the counting boundary by dividing the total motion region area by a reference area.

In these examples, people counting system must disclose facial appearances of the people.

Figure 2:
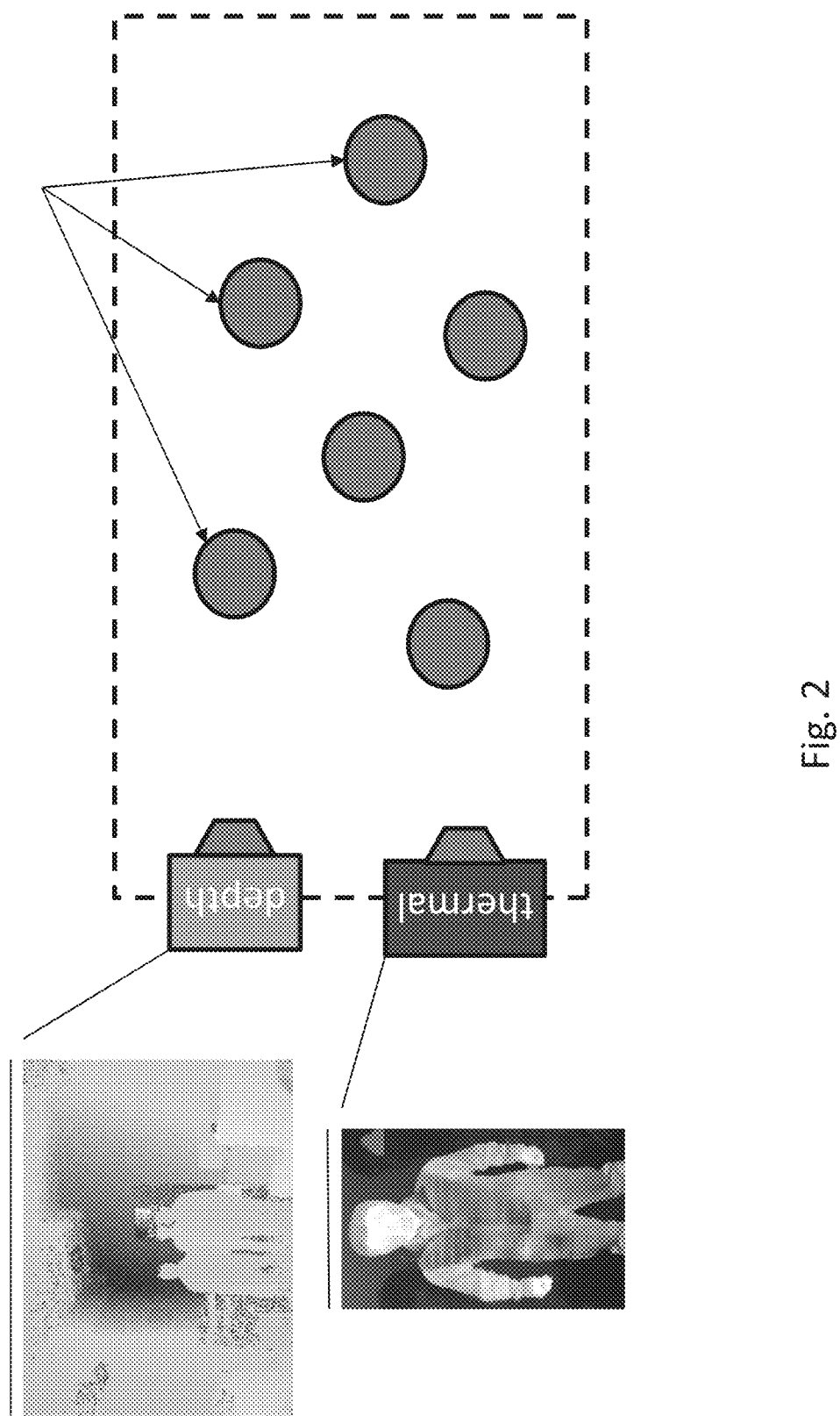
FIG. 2 is a schematic diagram of a counting device installed in a confined area.

Referring to FIG. 1A, an embodiment of the present invention is disclosed. The present invention provides an electronic device 10 for counting objects of similar type in an area. The electronic device 10 has a register for storing a number of counts of the objects in the area, a depth sensor 12 for measuring depth distances between a plurality of points of an object and the depth sensor; and a thermal sensor 14 for measuring temperatures of the points of the object. Preferably, the electronic device 10 may be used as a counting device and may be installed over a confined area as shown in FIG. 2.

In this embodiment, the counting device may combine the distance data collected by the depth sensor and the temperatures data collected by the thermal sensor to derive spatial thermal information of the object for determining an increase in the number stored in the register.

In one embodiment, the type of object is a homosapiens class or people. The counting device 10 may be used for counting the number of people in an area without disclosing/recording facial appearances of the people.

Referring to FIG. 1A, the counting device is adapted to carried out a method of counting a type of object within an area, comprising the step of
  (i) collecting distance data of one or more object in the area with a depth sensor, such that an object in the area is identified;
  (ii) collecting temperature data of the object in the area;
  (iii) combining the distance data and temperature data to derive a spatial thermal information for determining the object belongs to a type of objects;
  (iv) increasing a number stored in a register in the event that the spatial thermal information of the object is not found in the spatial information of objects in a previous time interval.

Without wishing to be bound by theory, a thermal camera may be useful to identify people by detecting the differential temperature difference between human and the environment, however when the ambient temperature rises to certain value, the camera may not effectively differentiate animate and inanimate objects.

The depth sensor or camera captures the scene and passes the data through a foreground extraction module for cleaning up the foreground signals and then the data is passed to a depth object identification module such that it can identify the objects in the premises.

A depth sensor may detect electromagnetic wave signals reflected from an object. In one embodiment, the electromagnetic wave signal is in the infrared light spectrum. In another embodiment, the electromagnetic signal is modulated with high speeds up to 100 MHz. The reflected light is collected onto a sensor capable of measuring the signal's phase ($\varphi$), amplitude (A), and offset (v). These are measured indirectly, by changing the intensity measurements.

In one embodiment, the counting device 10 is provided with an illumination unit for emitting electromagnetic wave signals or infrared light. In one embodiment, the illumination unit comprises one or more light emitting diodes for emitting electromagnetic wave signal. In another embodiment, the illumination unit is adapted to emitting electromagnetic wave signals of a plurality of wave lengths.

Figure 4:
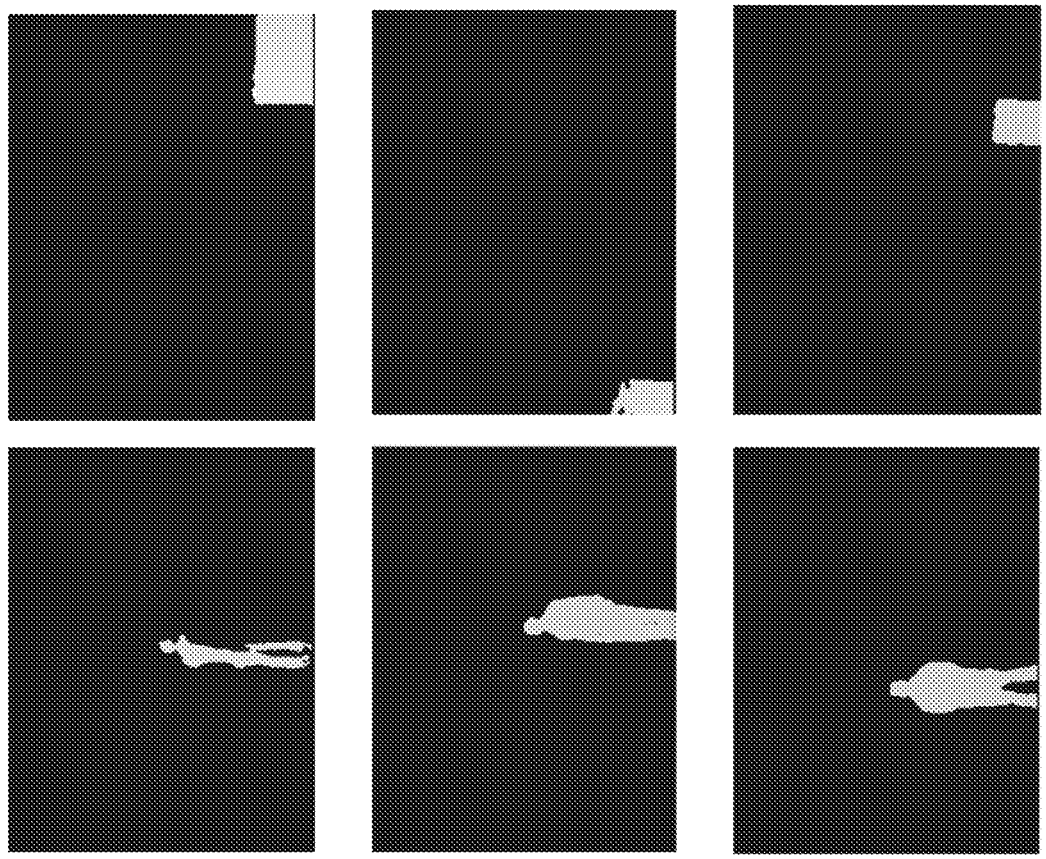
FIG. 4 is a sample image generated by segmenting the image of FIG. 3 according to different depth levels.
Figure 3:
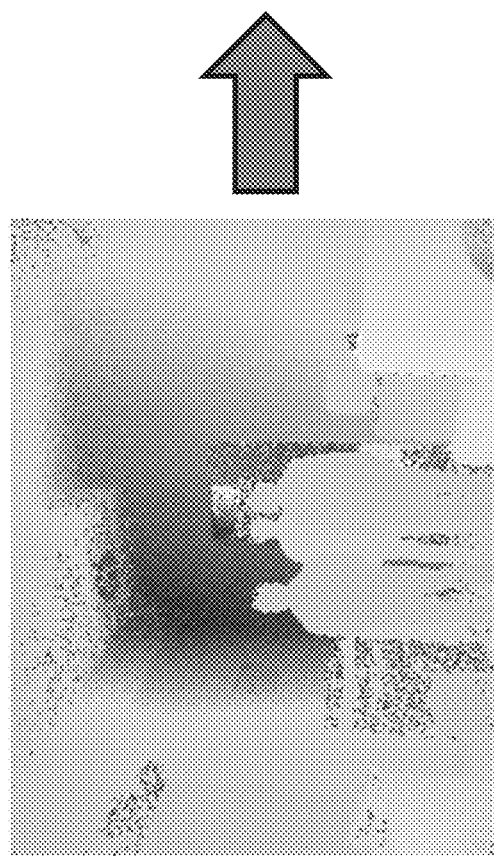
FIG. 3 is a sample image generated by a depth sensor of a counting device of FIG. 1.

The depth sensor 12 is adapted to identify an object by collating a plurality of points having depth distance of similar depth level into object groups. This can be achieved by segmenting objects in various depth levels, individual objects can be isolated and separately identified as shown in FIG. 3 and FIG. 4.

In one embodiment, the points of an object are considered as of the same object group if the distances are within the tolerance range of a reference distance.

In one embodiment, the depth sensor is a time of flight sensor for detecting an electromagnetic wave signal reflected back from the object.

From the phase difference between the emitted and received signal, the total distance the light travelled is determined. By dividing the total distance by two, the system can derive the object-sensor distance (D), also known as the depth. The system can further calculate the 3D coordinate for every point scanned as the depth sensor's focal length (f) can be adjusted by the system and is known. The system can then correct any radial distortion by converting the distorted values (index d) to the undistorted values (index u).

In another embodiment, the depth sensor comprises an ultrasound sensor and an ultrasound emitter. Alternatively, a stereo camera or a 3D camera may be used to capture images including the depth information.

The thermal sensor or camera captures the heat signature on the scene and then passes the data to a thermal object identification module for identifying the object with a distinct heat signature.

Different objects emit different amounts of black body radiations as a function of their temperatures. The radiation emitted by a living organism is quite different to non-living object. The heat radiated by a homo-sapiens is different to other animals.

In one embodiment, the thermal sensor 14 is an infrared photodetector which consists of one or more elements that measure these radiations. These sensors may be photosensitive in the far infrared range. Accordingly, silicon or germanium lenses may be used, as glass does not transmit these wavelengths.

In one embodiment, the system may be implemented with a quantum well infrared photodetector which is also known as a cooled infrared detector. In another embodiment, an uncooled infrared detector is used as they may be more compact and cost effective. In another embodiment, both the thermopile array and microbolometer type of detector are used to ensure an accurate result.

With a thermopile sensor, the heat radiated from an object may be absorbed by a small membrane of the sensor which caused the temperature raised. The temperature difference between the membrane and a thermal mass induces a change in the electric potential between the two known as the Seebeck effect. This system records a change in the voltage and derives an absolute temperature measurement of the object. A microbolometer has a similar structure but instead of detecting an induced current, it detects temperature coefficient of resistance.

Both sensors are able to simultaneously measure a number of absolute temperatures of the objects in a scene. The system will generate and display a false colour image. While the microbolometer technology is more mature, the thermopile array is more compact and cost efficient.

The counting device 10 further comprises a processing unit for determining whether an object belongs to a type of object by comparing the temperatures of an object group with one or more temperature pattern of the type of object.

The identification data from the depth identification module and the identification data from the thermal identification module are fused together. By fusing the images obtained from depth sensor and thermal sensor, the counting device of an embodiment of the present invention derives spatial thermal information of a particular time interval. This spatial thermal information of a particular is stored in a memory module of the counting device 10.

Figure 1B:
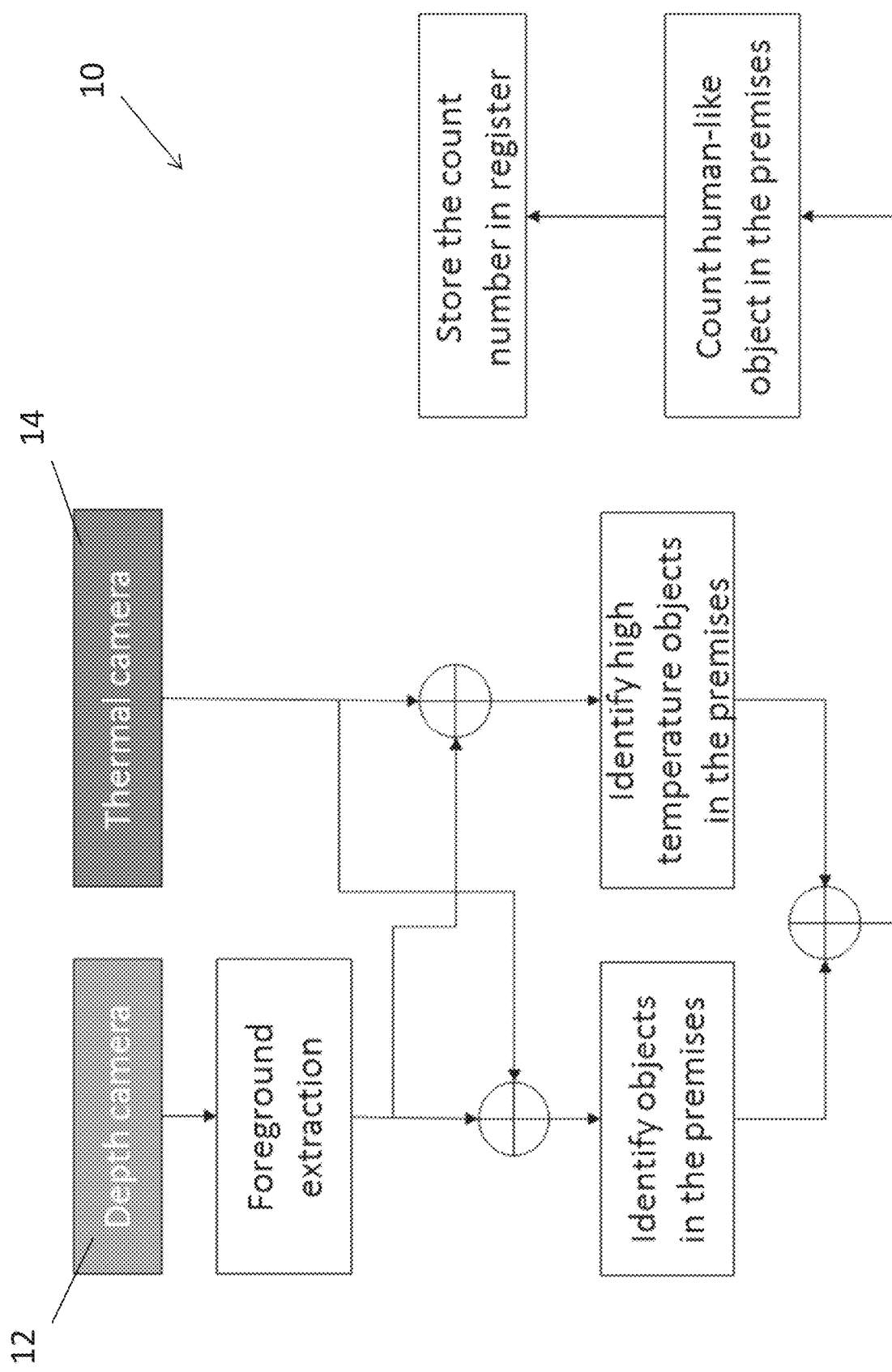
FIG. 1B is a schematic diagram of a counting device of an alternative embodiment of the present invention.

In an alternative embodiment, with reference to FIG. 1B, the counting device 10 may arranged to count all the objects within a detected area at a particular time. For example, if there are seven human like objects in the premises at time T, the counting system 10 will output seven. Similarly, at time T+1, if there are three human like objects, the counting system will output three.

In this embodiment, the counting system may be arranged to process the information in both images captured by each of thermal and depth camera. During the processing of an image captured by one of the thermal and depth camera, images captured by the other camera may provide supplementary information which may assist in determining the objects more accurately.

For example, if an object is too small to be identified in depth image, the thermal image may provide additional information to the analytical engine of depth image so that the small object can now be identified.

Optionally, the depth and thermal cameras may be arranged to perform a calibration process so as to obtain the intrinsic and extrinsic camera parameter.

Figure 1C:
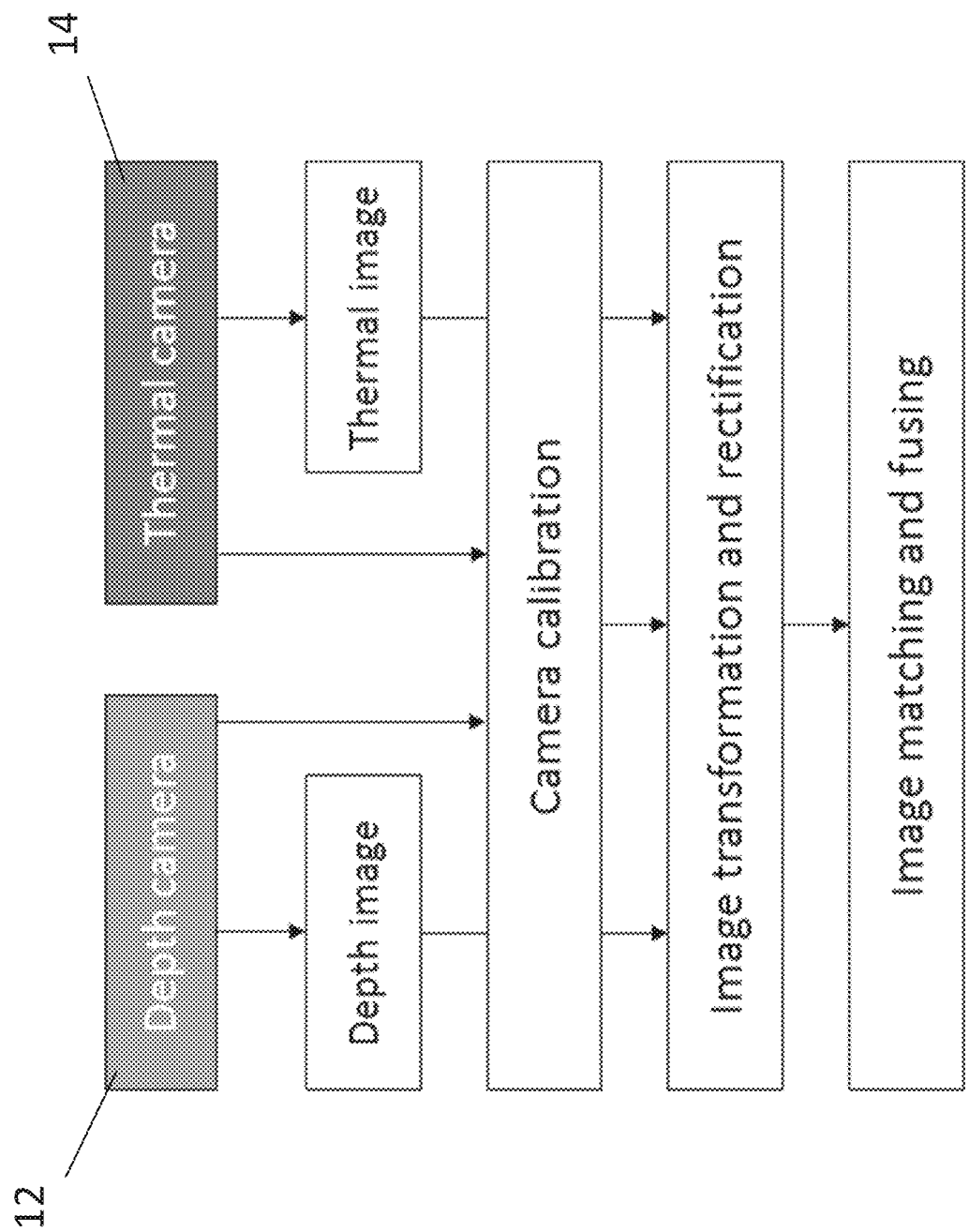
FIG. 1C is a flow diagram showing a process of image fusion procedure.

With reference to FIG. 1C, there is shown a flow chart of the image fusion process. Both the depth and the thermal cameras are calibrated with reference to the feature points of the calibration target. The features points should be detectable and identifiable by both the depth and thermal cameras.

Due to different field of view, resolution, view angle of both cameras, transformation and rectification of the images may be performed in order to ease the image fusion afterwards. The two images may then be fused and aligned based on the common feature points in both images. Such that accurate spatial thermal information based on the images captured by the two cameras may be obtained.

Figure 5:
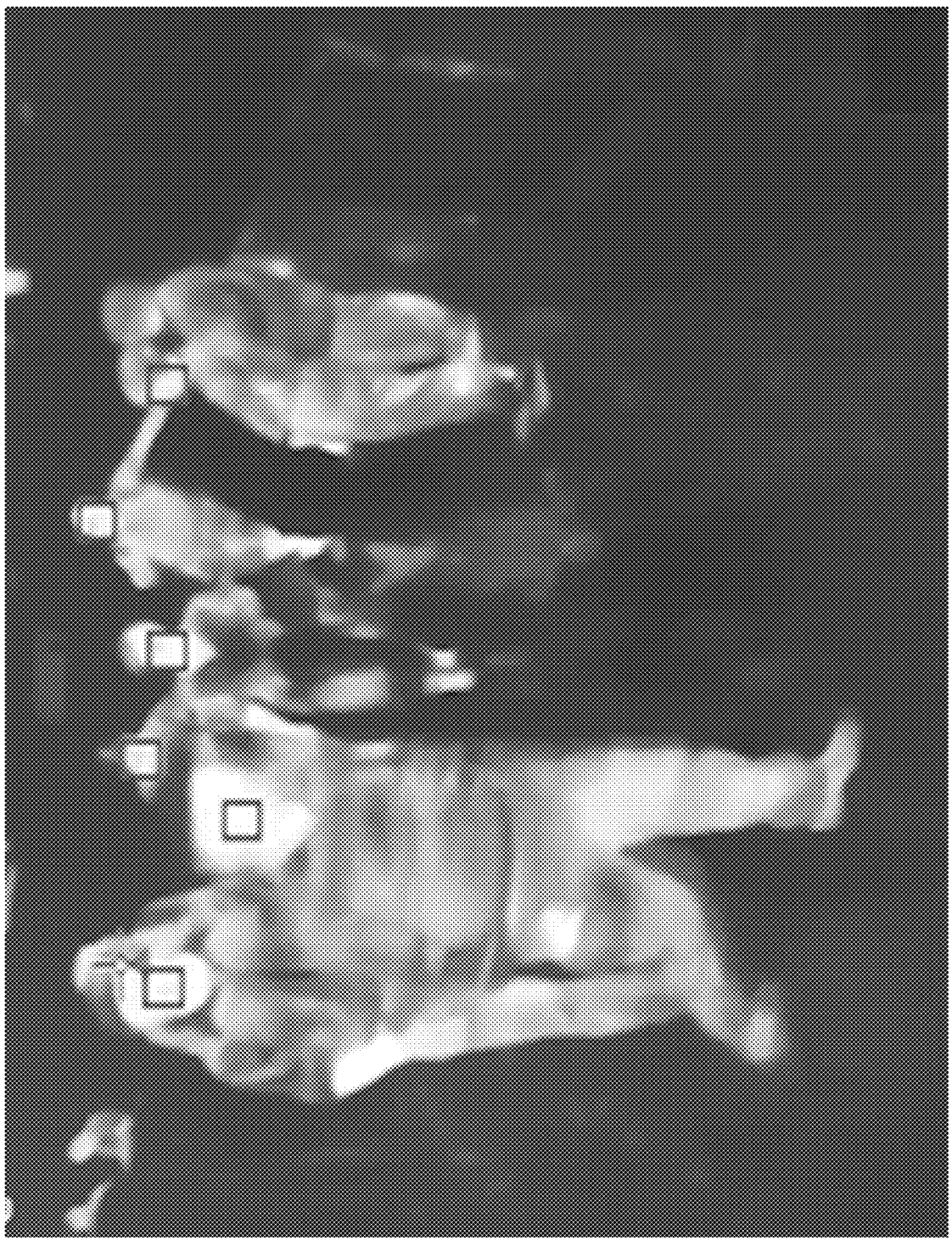
FIG. 5 is an image generated by the thermal camera of the counting device of FIG. 1A with identified high temperature objects which are labelled with rectangles.

With the spatial thermal information, any human-like object can be identified in the premises. Referring to FIG. 5, the system proceeds to the process of thresholding the image from thermal sensor or camera, the head position of human targets can be located and thus the human target can be identified. This process is typically carried out by the processing unit of the counting device.

The images or spatial thermal information from different frames or time intervals are then compared and only newly identified objects is counted in the people counting system.

In one embodiment of the present invention, the number stored in the register is increased when an object is identified in the spatial thermal information of a current time interval and the object was not identified in the spatial information of a previous time interval.

In one embodiment, the system is adapted to obtain a 3D thermogram as a means to detect objects. The depth sensor data and thermal sensor data are fused.

In one embodiment, this process comprises the step of ascertaining the focal length of the depth sensor and calculating the 3D coordinate of every pixel using the distance measurement.

Then the system proceeds to obtain the 3D position in the thermal sensor reference frame. The system will apply a translation and rotation to the 3D point cloud and project these points onto the calibrated thermal sensor in order to find the position on the thermal sensor. Thereby, each 3D point's temperature measurement can be derived by bilinear interpolating between its four nearest neighbours. Fusing and analyzing images from both sensors can yield a more accurate people counting methodology.

In an embodiment of the present invention, the identified objects will be tracked in multiple consecutive fused frames. The counting device 10 has a memory module installed for storing.

These embodiments may be advantageous in that no video camera is installed or used in the system. The depth sensor and the thermal sensor do not directly record the appearance of an object and hence no facial and colour image are recorded. As both sensors reveal no detail facial appearance of the object being detected, the privacy is entirely protected. The recording is thermal suitable in submission as an evidence in law enforcement.

It will also be appreciated that where the methods and systems of the present invention are either wholly implemented by computing system or partly implemented by computing systems then any appropriate computing system architecture may be utilised. This will include standalone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electronic device for counting objects of similar type in an area, comprising:
   a register for storing a number of count of the objects in the area;
   a depth sensor for measuring depth distances between a plurality of points of an object and the depth sensor;
   a thermal sensor for measuring temperatures of the points of the object;
   wherein the distances and the temperatures are used to derive spatial thermal information of the object for determining an increase in the number stored in the register, wherein the depth sensor is operable to calculate a 3D coordinate of each of the plurality of points using the distance data, which points are projected onto the thermal sensor in order to find positions on the thermal sensor, wherein the temperatures of each of the plurality of points is derived by bilinear interpolating between its neighbors.

2. An electronic device of claim 1, wherein the depth sensor identifies an object by collating a plurality of points having depth distance of similar depth level into object groups.

3. An electronic device of claim 2, wherein the similar depth level is determined by a reference depth distance and a tolerant range value.

4. An electronic device of claim 3, wherein a point is collated to an object group if the depth distance of the point is within the tolerant range value of the reference depth distance.

5. An electronic device of claim 4, wherein the depth sensor is a time of flight sensor for detecting an electromagnetic wave signal reflected back from the object.

6. An electronic device of claim 5, wherein the electromagnetic signal is modulated with high speeds up to 100 MHz.

7. An electronic device of claim 6 further comprising an illumination unit for emitting electromagnetic wave signals.

8. An electronic device of claim 7, wherein the illumination unit comprises one or more light emitting diodes for emitting electromagnetic wave signal.

9. An electronic device of claim 7, wherein the illumination unit is adapted to emitting electromagnetic wave signals of a plurality of wave lengths.

10. An electronic device of claim 4, wherein the depth sensor comprises an ultrasound sensor and an ultrasound emitter.

11. An electronic device of claim 1, wherein the thermal sensor comprises an infrared photodetector.

12. An electronic device of claim 11, wherein the infrared photodetector is a quantum well infrared photodetector.

13. An electronic device of claim 11, wherein the infrared photodetector is a thermal infrared sensor.

14. An electronic device of claim 2, further comprises a processing unit for determining whether an object belongs to a type of object by comparing the temperatures of an object group with one or more temperature pattern of the type of object.

15. An electronic device of claim 14, wherein the type of object belongs to a homosapien class.

16. An electronic device of claim 15 further comprising a memory module for storing the spatial thermal information of a plurality of consecutive time intervals.

17. An electronic device of claim 16, wherein spatial thermal information of objects in different time intervals is compared and the number stored in the register is increased when an object is identified in the spatial thermal information of a current time interval and the object was not identified in the spatial thermal information of a previous time interval.

18. A method of counting a type of object within an area, comprising the steps of:
   collecting distance data of one or more objects in the area with a depth sensor, such that an object in the area is identified;
   collecting temperature data of the object in the area;
   combining the distance data and temperature data to derive a spatial thermal information for determining the object belongs to a type of objects;
   comparing spatial thermal information of objects in different time intervals and increasing a number stored in a register in the event that the spatial thermal information of the object is not found in the spatial thermal information of objects in a previous time interval;
   calculating a 3D coordinate of each of the plurality of points using the distance data; and
   projecting these points onto a thermal sensor in order to find positions on the thermal sensor, wherein the temperature data of each of the plurality of points is derived by bilinear interpolating between its neighbors.

19. A method according to claim 18, wherein
   collecting distance data of one or more objects comprises collecting distance data of a plurality of points of the one or more objects; and
   collecting temperature data of the object in the area comprises collecting temperature data of the plurality of points of the object in the area.

* * * * *